Aug. 23, 1932.  C. DOERING ET AL  1,873,923
BUTTER CUTTING MACHINE
Filed Oct. 21, 1929  3 Sheets-Sheet 1

Inventors:
Charles Doering,
Henry Doering.
By Harry C. Helmot
Atty.

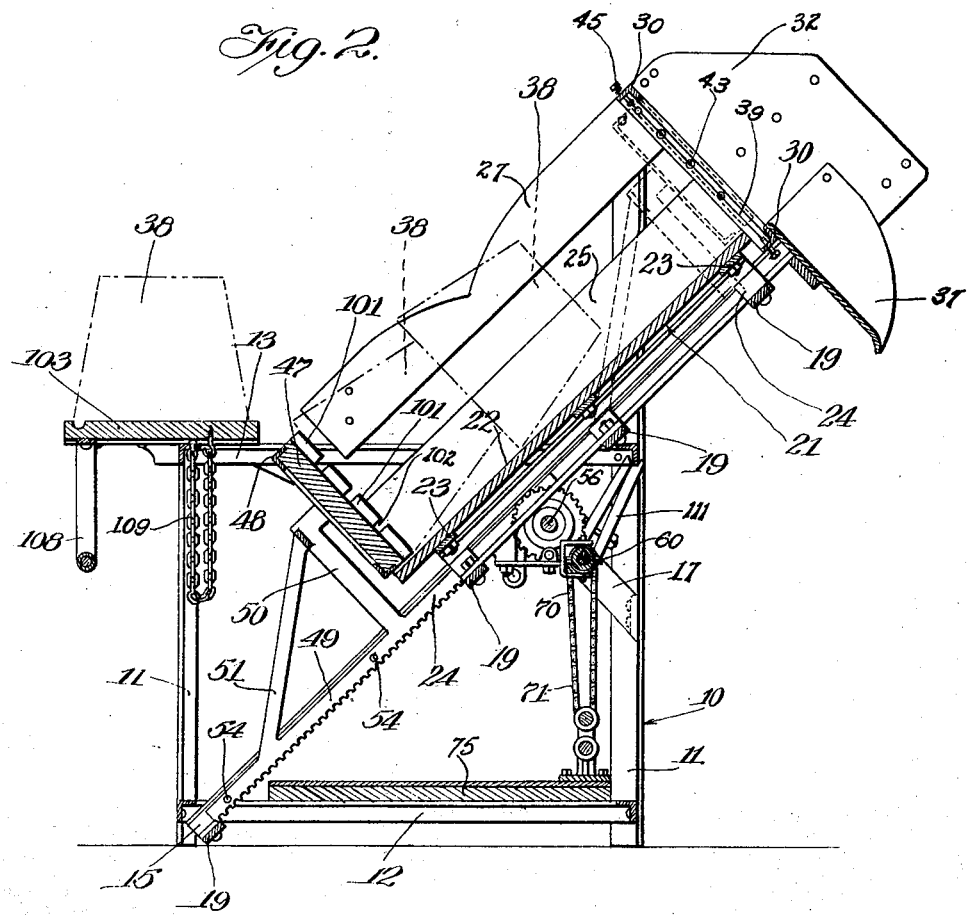

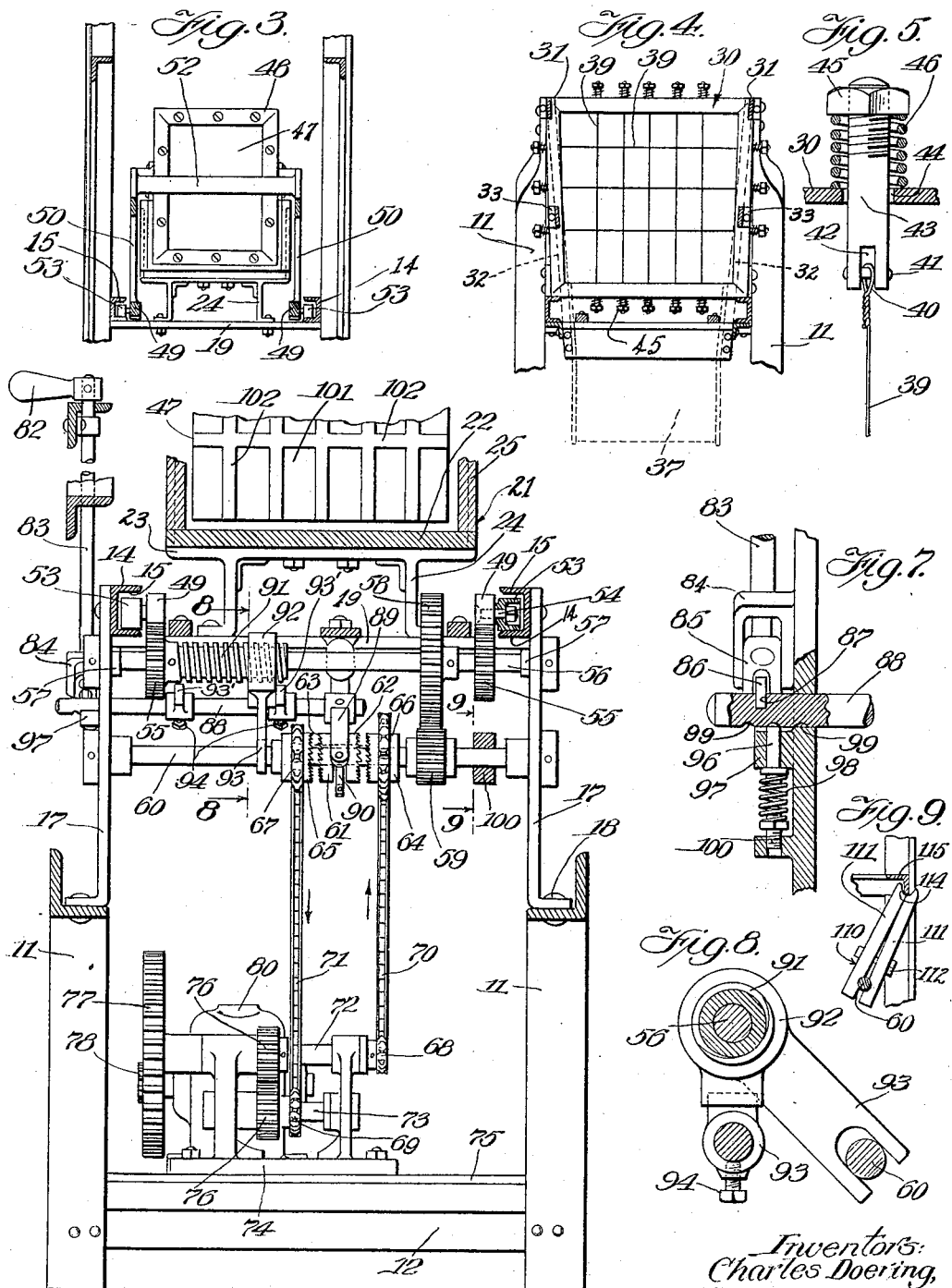

Patented Aug. 23, 1932

1,873,923

UNITED STATES PATENT OFFICE

CHARLES DOERING AND HENRY DOERING, OF CHICAGO, ILLINOIS

BUTTER CUTTING MACHINE

Application filed October 21, 1929. Serial No. 401,179.

This invention relates to cutting devices and more particularly to means for severing plastic material into fragments, although certain features thereof may be employed with equal advantage for other purposes.

It contemplates more especially the provision of means for effecting the severance of large quantities of plastic material into fragments with increased speed and minimum handling, thereby enabling a single attendant to be highly productive in the processing of such materials for any occasion.

Plastic material such as butter is usually stored in bulk in any suitable containers such as wooden tubs for sale in small quantities either in the form of prints or bulk. Bulk plastic edibles are now converted into prints of uniform size so as to receive sanitary wraps as a protective cover therefor. This requires the bulk edibles to be processed in any suitable manner for conversion into prints or bricks for resale to the ultimate consumer. This is effected by machinery of the type disclosed in the United States Letters Patent, numbered 1,683,873, wherein bulk plastic material is carried along a predetermined path by spiral conveyors for extrusion through a suitable die to impart a predetermined shape and consistency thereto. Prior to the delivery of the bulk material to machines of this character, it is necessary or at least highly desirable to reduce such to fragments so that the material may be properly and effectively processed for the specified purpose.

Numerous devices have heretofore been devised for the severance of such bulky edibles into fragments; however, these are not especially efficacious owing to the fact that much labor is required both in the manipulation thereof as well as the placement of the matter therein. Processing machines such as the butter print device hereinabove referred to, handle considerable volume of plastic substances in a short duration of time, and in consequence thereof require the steady feeding of fragmentary edibles thereto so as to insure continuity of operation without repeated stopping and starting.

To this end it is necessary that the severing device be quite rapid in operation and handle large volumes of edibles to feed sufficient quantities to the processing machine without entailing the full time of an attendant, thereby enabling an individual to look after one or more machines without undue exertion and time consumption.

One object of the present invention is to simplify the construction and improve the operation of devices of the character mentioned.

Another object is to provide severing devices of increased capacity and speed in reducing plastic substances to fragments.

Still another object is to provide a power device capable of handling increased quantities of plastic edibles for severance with increased speed and minimum handling.

A further object is the provision of means for effecting the placement of several batches of edible plastics in alignment for continuous movement in the path of severing machine.

A still further object is to provide a means for feeding plastic edibles along an inclined path to effect the severance thereof and consequent discharge for processing without handling.

Still a further object is to impart predetermined movement to feeding means along a predetermined path and then effecting the return thereof at an increased speed to enable a cycle of severing operation with minimum labor and time consumption.

Other objects and advantages will appear from the following description of an illustrated embodiment of the present invention.

In the drawings:

Figure 2 is a sectional view taken along a longitudinal median of Figure 1.

Figure 3 is a sectional view taken substantially along line 3—3 of Figure 1.

Figure 4 is a sectional view taken substantially along line 4—4 of Figure 1.

Figure 5 is a fragmentary view in section of a severing wire instrumentality with its securing anchor in association therewith.

Figure 6 is a sectional view taken substantially along line 6—6 of Figure 1.

Figure 7 is a sectional view taken substantially along line 7—7 of Figure 1.

Figure 8 is a sectional view taken substantially along line 8—8 of Figure 6.

Figure 9 is a sectional view taken substantially along line 9—9 of Figure 6.

Figure 1:
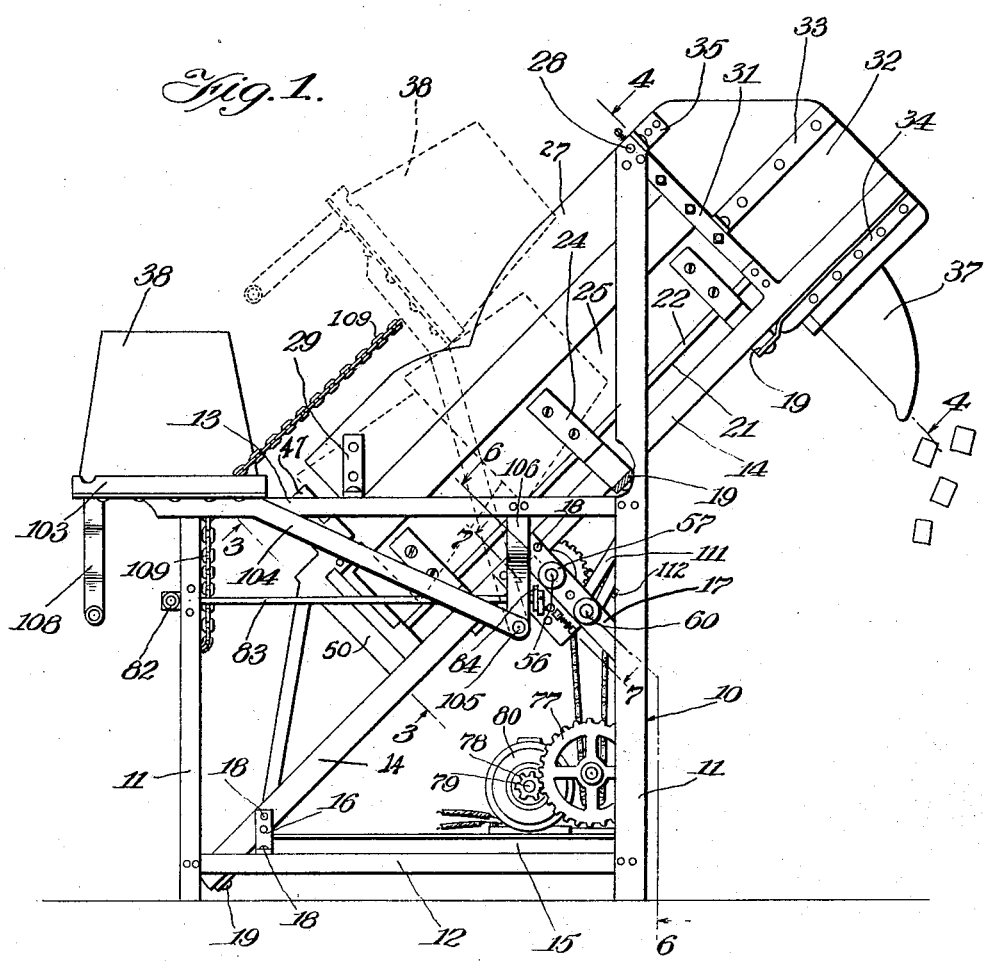
Figure 1 is a side view in elevation of a device embodying features of the present invention.

The structure selected for illustration comprises a sub-structure or frame work 10 which is composed of corner standards 11 formed from suitable angle irons of standard construction. Cross members 12 and 13, in this instance constituting horizontally disposed angle irons, are bolted or otherwise secured to the standards 11 proximate to the bottom and top thereof, respectively, to provide a rigid frame work whereon instrumentalities, to be hereinafter described, may be mounted to accomplish their intended purpose.

In order to suitably support the plastic material along a predetermined path, inclined members 14, in this instance provided with confronting lateral channels 15, are secured to the frame 10 by means of brackets 16 and 17, these being riveted or otherwise associated with the frame work 10 and the inclined bars 14 by suitable fasteners 18. It is to be noted that the channel bars 14 extend beyond the forward standard 11 for fixed space relation with respect to each other owing to crossbars 19 which maintain them in true parallelism.

The plastic substance is sustained in an inclined trough 21, in this case U-shaped, for inclination in spaced relation with the inclined members 14 which serves as a support therefor owing to the attachment of the base board 22 to cross members 23 which constitute a portion of a bracket 24. The brackets 24 extend normally to the channel bars 14 for attachment thereto and the cross members 19 so that the sides 25 of the trough 21 may be held fixed with reference to the base 22 above the channel bars 14. The trough 21 may be of wooden construction; however, other materials may be employed with equal advantage for this purpose as commercial practice may dictate.

In order to accommodate batches of plastic substances of considerable extent and depth within the trough 21, side extensions 27 are superimposed above the sides 25 in spaced aligned relation therewith for fixed attachment to the standards 11 and crossbars 13 by means of fasteners 28 and 29, thereby effecting the rigid support thereof to confine the material within the trough against any possible displacement laterally thereof.

It is to be noted that the trough 21 terminates in a substantially rectangular frame 30, in this instance of angle iron which has a square configuration to constitute the discharge end of the trough 21, it being secured thereto by means of exterior angle braces 31 which extend between the channel bars 14 and the forward standards 11. As shown, the trough 21 terminates in downwardly converging extensions 32 which are supported by means of brackets 33 and 34 secured to the trough support, in this instance to the brace 31 and crossbar 19, respectively, on both exterior sides thereof, there being an angle bracket 35 connecting the upper edge of the extension 32 with the extremity of the forward standards 11 to guide the discharge of the plastic material through the frame 30 to a hopper or machine for further processing owing to a spout 37 which depends therefrom in any suitable manner as commercial practice may dictate, there being a continuous passage from the trough base 22 to the spout 37 to guide the fragments created incident to the passage of the plastic substance 38 through a severing device mounted in the frame 30.

The severing device comprises, in this instance, normally intersecting parallel strands of piano wire 39, which are articulated at their extremities to form loops 40 around pins 41 which bridge a slot 42 provided in the extremity of a threaded shank 43. The shank 43 extends through correspondingly shaped apertures 44 provided in the frame 30, these being held in position by means of a nut 45 spaced from the frame 30 owing to spiral springs 46 which envelop the shank 43 between the nut 45 and the frame 30, thereby tensioning the wires 39 between aligned anchor studs 43 to effect the severance of the plastic material as it passes therethrough. Any number of wire strands 39 may be disposed in intersecting parallelism depending upon the size of the fragments and the cross-sectional extent of the trough 21, which corresponds substantially in width to the dimensions of a tub of butter.

Means are provided to feed the plastic substance 38 along the trough 21, this being effected by means of a substantially rectangular member 47 composed of wood or other suitable material to conform substantially with the interior of the trough 21 for free reciprocation therein. To this end, the feeding member 47 is provided with a reinforcing metallic rim 48 which affords the attachment thereof to spaced racks 49 owing to brace members 50 integrally or otherwise disposed intermediate the rim 48 and the rack 49, there being an inclined auxiliary brace 51 forming a triangular connection between the feeding member 47 and the racks 49 which are maintained in spaced relation by a rod 52 (Figure 3).

The racks 49 with their feed member 47 in rigid association therewith are guided for movement along a path parallel to the inclination of the trough 21 by means of rollers 53 which are journaled on pins 54 secured for lateral extension from the racks 49, the rollers 53 being disposed in the channels 15 of the inclined bars 14 for rotary movement therein to guide the reciprocation of the feed member 47 responsive to the rotation of spur gears 55 in mesh with racks 49. The gears 55 are fixed to a shaft 56 which is journaled in suitable bearings supported by the inclined brackets 17. Another spur gear 58 is pinned or otherwise secured to the shaft 56 for rotation in unison therewith responsive to the rotation of a pinion 59 fixed to a shaft 60 journaled in brackets 17 for alignment with the shaft 56. In order to impart rotation to the shaft 60 in either direction, a clutch member 61 is splined for slidable movement along the shaft 60 for rotation therewith, it being provided with teeth 62 and 63 disposed in opposite directions on the lateral faces thereof to engage correspondingly toothed clutch elements 64 and 65, respectively. The clutch elements 64 and 65 carry sprockets 66 and 67 of different sizes, respectively, the former being larger than the latter for reasons which will appear more clearly hereinafter.

It is to be noted that the sprockets 66 and 67 idle on the shaft 60 for free rotary movement relative thereto owing to their connection with correspondingly shaped sprockets 68 and 69 by means of chains 70 and 71, respectively. The sprockets 68 and 69 are carried by shafts 72 and 73 journaled in suitable bearings supported by a suitable framework 74 mounted on the base 75 for support by the cross-members 12 of the sub-structure 10 described hereinabove. The shafts 72 and 73 are interconnected by suitable gears 76 so as to drive them in opposed directions responsive to a spur gear 77 in mesh with a pinion 78 which is fixed to the armature shaft 79 of an electric motor 80. In consequence thereof, the sprockets 66 and 67 are continuously driven in opposite directions (see arrows, Figure 6), thereby imparting any desired directional rotation to the pinion 59 depending upon whether the clutch member 61 engages the clutch elements 64 or 65, it being rendered inactive by the disposition of the clutch member 61 intermediate the sprockets 66 and 67 out of engagement with the respective clutch elements 64 and 65.

The movement of the feed member 47 is controlled, in this instance, by a hand lever 82 which extends normally from the end of a rod 83 journaled between a rear standard 11 and a bracket 84, there being a link 85 secured to the end thereof to carry a pin 86 in registry with a correspondingly shaped aperture 87 provided in a rod 88 extending parallel to the shafts 56 and 60 for extension therebetween to carry a yoke 89 which engages a fork 90 operatively connected to the clutch members 61 to effect the throw thereof along the shaft 60 between the clutch elements 64 and 65 for meshing engagement with one or the other thereof.

In order to render the feeding member 47 inactive responsive to the approach thereof to its extreme movement of travel, the shaft 56 carries a worm 91 for rotary movement therewith in meshing engagement with a correspondingly threaded collar 92 having a furcated extension 93 to receive the shaft 60 therebetween, thereby precluding the rotation of the collar 92 to effect the traverse thereof between stops 93' adjustably fixed to the bar 88 by means of set screws 94. As a consequence, the stops 93' may be so positioned as to extend in the path of the collar 92 to effect the throw of the bar 88 incident to the arrival of the fed member 47 at the intended extreme position within the trough 21, the throw being such as to move the clutch member 61 to its neutral position.

The throw of the bar 88 is controlled by a spring impelled detent 96 which is reciprocal within a boss 97 fixed to one of the brackets 17, there being a spiral spring 98 in engagement with the head thereof to urge it in the direction of a series of concavities 99, in this instance three, provided in the bar 88 to correspond with the three positions of the clutch member 61, namely neutral and meshing engagement with the clutch elements 64 and 65. The tension of the spring 98 which urges the detent 96 in the path of the concavities 99 may be varied owing to an adjusting screw 100 disposed in alignment with the plunger detent 96 to receive the spring 98 therebetween. It will be apparent that the movement of the hand lever 82 in either direction will cause the clutch member 61 to engage the clutch element 64 to drive the feed member 47 toward the severing instrumentalities 39 at a slower speed than the return thereof effected by reversing the direction of lever throw to engage the clutch element 65 which has a smaller sprocket 67 thereon, this being conducive to the traverse of the member 47 downwardly to its initial position at a greater speed than its opposite movement occasioned by the larger sprocket 66.

In order to effect the traverse of the plastic material 38 entirely through the wires 39, the faces of the member 47 are provided with raised projections 101 integrally or otherwise associated therewith to define intersecting grooves 102 to enable the entry of the wire 39 therein, thereby extending the projections 101 beyond the severing instrumentalities 39 so that the plastic material may be extruded entirely therethrough without waste or the accumulation thereof.

The plastic material 38 which may conform in configuration with the interior of a butter tub, is disposed in the trough 21 by the placement thereof on a table or platform 103 secured to links 104 having the free extremities thereof pivoted as at 105 to depending brackets 106 fixed to cross-members 13, thereby normally disposing the table 103 thereon to sustain the plastic material rearwardly of the trough 21. In consequence thereof, the plastic substance 38 may be pushed by the attendant for displacement within the trough 21 while a second batch of material may be disposed therein in advance of the first batch by elevating the platform 103 above its pivot 105 as shown in dotted outline in Figure 1, a handle 108 being provided thereunder for that purpose. The pivotable throw of the table 103 is limited by a chain 109 having one end thereof secured to the frame 10 with the other end fixed to a link 104, thereby bringing the table or platform 103 to a stop when disposed normal to the base of the trough 21 and in parallelism to the feed member 47 to allow the second batch of plastic material 38 to descend just in advance of the first batch.

The lever 82 is then manipulated to cause the clutch member 61 to engage the clutch elements 64, thereby effecting the traverse thereof along the inclined trough 21 to feed the batches 38, in this instance two, through the severing instrumentalities 39. The return thereof may then be effected by reversing the movement of the lever 82 so that the clutch element 65 may be rendered active; however, the feed member 47 is brought to a stop at its extreme movement by the stops 93 so that the attendant need not watch the operation of the device in order to avoid any injury thereto.

In order that the moving elements may be brought to an immediate stop responsive to the throw of a clutch member 61 to its neutral position, a brake 110, in this instance comprising split members 111, is caused to embrace the shaft 60 owing to a carriage bolt 112 which extends therethrough so that any desired frictional reaction may be created between the shaft 60 and the members 111 which are composed of wood or any other material as commercial practice may dictate. The members 111 are grooved at their extremities 114 so as to engage an angle iron 115 constituting a part of the frame 10 to preclude the notation thereof in either direction with the shaft 60; however, other instrumentalities may be employed with equal advantage for this purpose.

Various changes may be made in the embodiment of the invention herein specifically described without departing from or sacrificing any advantages thereof as defined in the appended claims.

We claim:

1. In a device of the character described, the combination with conveying means for feeding plastic material along a predetermined path, of cutting means in said path, means for placing aligned batches of plastic material in the path of said conveying means, and means for rendering said conveying means inactive responsive to the severance of the plastic material.

2. In a device of the character described, the combination with an inclined trough for receiving plastic material, of means for disposing batches of plastic material in alignment along said trough, of conveying means for feeding plastic material along said trough, and severing means in the path of said conveying means.

3. In a device of the character described, the combination with an inclined trough for receiving plastic material, of pivoted means for disposing batches of plastic material in alignment within said trough, conveying means for feeding plastic material along said trough, and severing means in the path of said conveying means.

CHARLES DOERING.
HENRY DOERING.